United States Patent [19]

Levine

[11] 4,182,568
[45] Jan. 8, 1980

[54] MULTIPLEXED ELECTROSTATIC PHOTOCOPIER

[76] Inventor: Alfred B. Levine, 2924 Terrace Dr., Chevy Chase, Md. 20015

[21] Appl. No.: 718,260

[22] Filed: Aug. 27, 1976

[51] Int. Cl.² ............................................. G03G 15/28
[52] U.S. Cl. ................................. 355/8; 355/14 R; 355/80
[58] Field of Search ................................ 355/8, 14, 89

[56] References Cited

U.S. PATENT DOCUMENTS 3,825,338   7/1974   Kolibas ............................... 355/8 X
3,998,543   12/1976  Wick et al. .......................... 355/8 X Primary Examiner—William M. Shoop

[57] ABSTRACT

A multiplexed electrostatic copier having plural separated scan stations for randomly receiving and scanning documents to be copied, and a common developing mechanism for electrostatically making copies of the scanned images, and identifying and delivering the copies to the proper user. Provision is made for simultaneous or sequential operation by the different scan stations and for on-line and off-line modes of operation to effectuate the multiplexing by the common developing mechanism.

17 Claims, 3 Drawing Figures

MULTIPLEXED ELECTROSTATIC PHOTOCOPIER

BACKGROUND OF THE INVENTION

1. Field of Invention

This invention generally relates to electrostatic copiers, and more specifically to such copy machines having plural input optical scan stations for receiving images to be copied combined with a common developing and copy feed mechanism for making copies of the scanned images in a multiplexed fashion and selectively delivering the copies back to the correct station.

2. Prior Art

At the present time coin operated, manual feed electrostatic photocopy machines are commonly available in public libraries, governmental offices, and other public areas; as well as in private offices, for making one-at-a time copies of individual documents, pages of books, or the like. Such machines have only a single scanning station for receiving each document to be copied in sequence; and if more than one user wishes to employ the machine, such person is delayed and must await the completion of use by the prior user. In many libraries and other busy locations, more than one, and in some instances many, machines of this same kind are installed to reduce the waiting time for the availability of a copy machine. However, the use of multiple machines is often unsatisfactory and wasteful in both space and cost, since each machine occupies a considerable amount of space than could be otherwise used to advantage; and furthermore there is usually still insufficient machine capacity to fulfill the needs of a plurality of users wishing to use the machines at about the same time. Additionally, this practice is also wasteful in both equipment and cost since each machine comprises a completely self-contained unit including its own optical scanning mechanism, paper feed, electrostatic development, and copy delivery mechanisms; many of which mechanisms operate in a stop-go time sequence and therefore have insufficient operating time, from an efficiency standpoint, even when the overall machine is continuously in use.

More sophisticated high speed electrostatic copy machines are also presently available that include programmable automatic mechanisms for automatic feed and copying of series or stacks of documents at very high speed. In such machines, the documents to be copied are automatically fed to the machine in sequence and one, or many copies of each are very rapidly made and automatically collated and delivered by the machine. Similarly high speed, high capacity machines are also available for automatically copying images from strips of film, webs, magnetic tapes, and the like, wherein the carriers are automatically fed to the machines, the images are automatically copied, and the copies are automatically collated and delivered in a preprogrammed arrangement. However, such high speed automatic machines are far too expensive, and otherwise not useful or needed, for individual manually fed copy making by coin operated users, or by other users on a one-copy-at-a-time basis, since the high speed of operation of the reproducing mechanism is of little benefit to the user in view of the comparatively long time period required to manually feed the documents or books to be copied to the scanner in a one-at-a-time manner.

SUMMARY OF THE INVENTION

According to the present invention there is provided a modified combination of the best features of the "manual" feed electrostatic machines with those of the more automated electrostatic machines that vastly increases the output productivity of coin operated or button operated individual feed copy machines, while at the same time reducing the cost and space requirements demanded by the use of plural individual coin operated machines. In brief, these advantages are obtained by multiplexing a plurality of individually and randomly operable optical scan stations with a common, high speed electrostatic copy making mechanism. In this manner, a single machine is provided having the copy output capacity of a group of individual manually fed machines, yet at space and cost requirements that are much lower than that of the combined individual machines.

According to a first preferred embodiment, the multiplexing operation is performed by programming the machine to operate in a direct or on-line manner in response to actuation of a first operated scan station, and in an indirect or off-line manner, with temporary storage of the optical image, where one of the scan stations is actuated, after the machine is cycling in response to the first operated station. Where the machine receives documents to be copied by more than one scan station simultaneously, both images are developed during a single cycling of the high speed developer mechanism, in an on-line mode. Alternatively, the machine can be preprogrammed to respond to the plural optical stations in a given sequential order, whereby upon simultaneous commands from more than one station, the machine cycles to respond to one given station in an on-line mode and then to other stations in given order in off-line mode.

According to other preferred embodiments, the common developing mechanism may be operated continuously whereby random operation of one or more scan stations automatically interconnects all such stations immediately in an on-line mode of operation, regardless of whether the stations are actuated simultaneously or sequentially.

In still further embodiments, the machine may be preprogrammed to always operate continuously in an on-line manner but to automatically discontinue cycling of the developer mechanism where the scan stations are not actuated for a time period of one or two moments.

In the above embodiments, the images transmitted from each of the individual scan stations to the common developing mechanism are differently identified by code or the like representing the originating station so that the copies being made are selectively separated and properly diverted and conveyed back to the originating station.

DETAILED DESCRIPTION OF PREFERRED EMBODIMENTS

Figure 1:
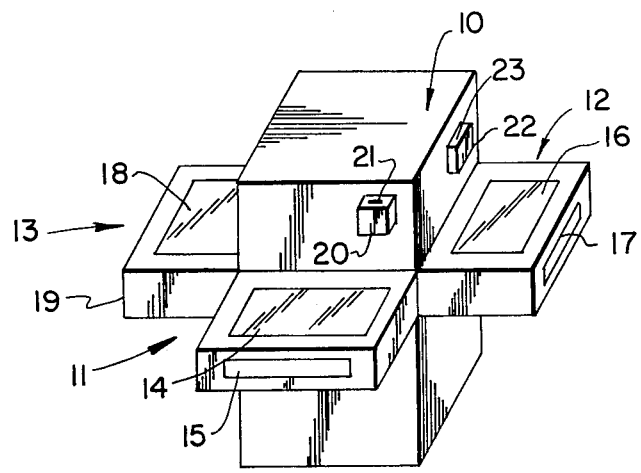
FIG. 1 is a perspective view, illustrating a common central housing and plural scan stations of a multiplexed electrostatic copier according to the invention.

As shown in FIG. 1, a preferred multiplexed electrostatic copier device according to the invention comprises a common central housing 10 having a plurality of separated optical scan stations 11, 12 and 13 supported by the common housing and so located and disposed with respect to one another that a plurality of different users can randomly make use of any one or more of the scan stations for making copies of documents, books, or objects without interfering with other users. In the disclosed arrangement of FIG. 1 the central housing is provided as a four sided rectangularly shaped structure 10, with each of the four outer flat walls supporting a projecting platform 11, 12 and 13, each adapted to receive the documents or objects to be optically copied on its upper surface 14, 16 and 18, respectively, and to deliver copies of the images reproduced through outlets or slots provided in each platform 15, 17 and 19, respectively, located at the front fact of each scan platform and adjacent the copy area.

As will be discussed in greater detail below, each of the scan stations 11, 12 and 13 operates completely independently of the other stations by different users and is accordingly provided with a separate actuating button and switch, or a coin operating switch located near each station. In the machine illustrated, scan station 11 is provided with its coin receptacle and switch 20, having a slot 21 to receive coins or tokens to start or actuate the scanning mechanism for that station. Similarly, scan station 12 is provided with coin receptacle 22 for independently actuating the optical scanning mechanism for this station. Upon actuation of any one or more of the scan station, a common high speed electrostatic developing mechanism within housing 10 functions to develop a copy of the scanned image from that station or stations, and to deliver that copy or copies to the outlet slot of that station where the master was scanned. It will be appreciated that the invention is not limited to a multiplexed copier having four scan stations, but machines having either a greater or lesser number of scan stations may be provided.

Figure 2:
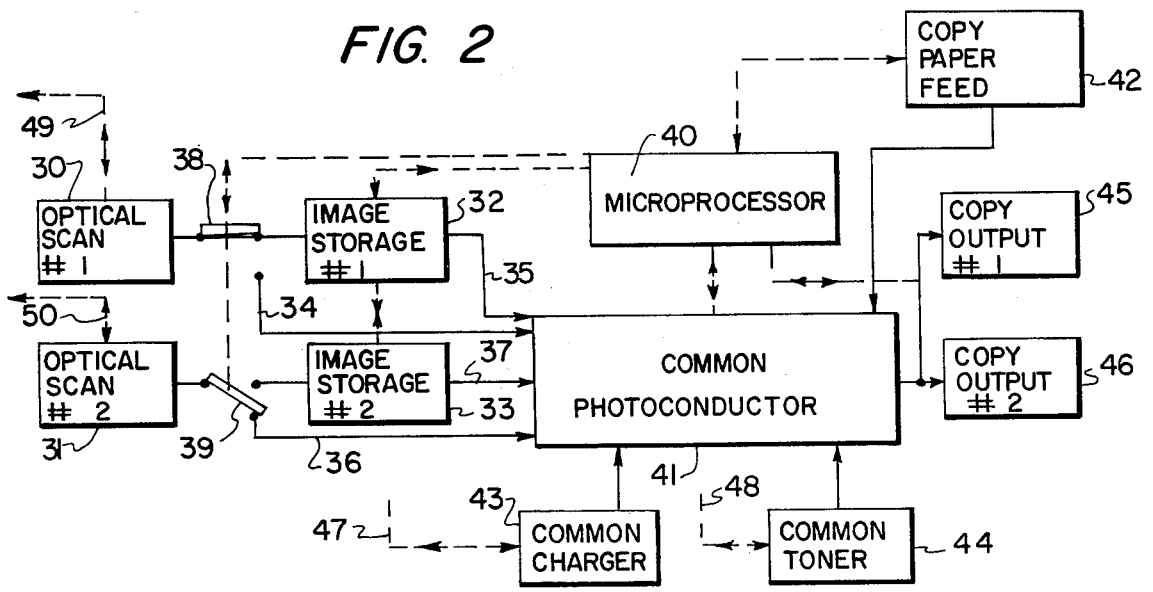
FIG. 2 is a schematic block diagram illustrating a sequential multiplexing system according to the invention.

FIG. 2 shows the operating mechanism of a preferred embodiment having two scan stations 30 and 31 selectively feeding a common electrostatic copy developing mechanism, including a common photoconductor 41, in which the multiplexing operation of the machine is preferably controlled by a microprocessor 40. In this embodiment, the machine provides a direct or substantially immediate "on-line" development of the image in response to the actuation of either one of the scan stations 30 or 31, and an "off-line" or temporary storage of the image scanned by the second operated station in the event that the second scanning station is actuated before the development cycle is completed in response to the first actuated station. Following completion of the first cycle, the temporarily stored image, is then automatically applied to the common electrostatic development mechanism including photoconductor 41, to produce a copy corresponding to the second scanned image. By the use of a high speed electrostatic development apparatus, this "off-line" delay from the second station may be made sufficiently short in time so that the subsequent user may not even be aware of the fact that the machine is functioning in an off-line manner.

Returning to FIG. 2 for more details of this embodiment, the two scan stations 30 and 31 are each selectively connectable over lines 34 and 36 to the common photoconductor 41 or to image storage means 32 and 33, respectively, for temporary storage of the scanned image. In this embodiment when one of the scan station is directly connected to the common photoconductor 41, for on-line operation, the other scan station is automatically connected to its temporary image storage means for off-line operation.

In a conventional manner, the common photoconductor drum, belt, disc, or the like 41 is first electrostatically charged by high voltage charger 43 prior to receiving the optical image to be developed. Following the application of the optical image from the scan station or the storage means, the latent electrostatic image is developed on the rotating photoconductor drum 41 by the application of liquid or powdered toner from the developer station 44. The developed or toned image is then transferred from the drum or web 41 to a sheet of copy paper supplied by the paper feed 42, and the copy sheet bearing the toned image is fused and conveyed to either of the outlets 45 or 46 corresponding to that scan station where that image originated.

For automatically directing the copy sheet to the correct one of the separate outlets 45, 46 each copy sheet is provided with a simple coding that identifies that one of the scan stations where the image originated. This code is generated by the scan station itself that transmits a fixed identifying code signal from the station along with transmitting the optical image from the document to be copied. The station identifying code is applied directly to the photoconductor 41 at the margin of its image area (not shown) along with the image when that station is operating "on-line", and is developed and transferred to the copy sheet along with the image. When that station is operating "off-line", the code is temporarily stored along with the image and later applied to the photoconductor (41) with the same result. For responding to the code, photocell detectors (not shown) are employed at the outlet, to recognize the code on each document and to divert that document to the proper one of outlet chutes 45 and 46 corresponding to the detected code. It will be appreciated by those skilled in the art, that very elementary dot codes or bar codes can be used for this purpose in view of the very limited number of scan stations to be identified. For example, in a machine having four scan stations, a simple dot code may employ one dot for the first station, two dots for the second, and so forth. A reader for such code may correspondingly use four photocells (not shown) at the outlet to read each copy sheet as it passes the fuser and divert the sheet to output 45 where one dot is detected, or the output 46 where two dots are detected, and so forth. Since "on the shelf" dot and bar code readers and related conveyor parts are presently available on the open market, a further description of such devices is not considered to be necessary in this specification. Typical mechanisms that may be employed for this purpose with minor modification are disclosed in U.S. Pat. Nos. 3,650,204 and 3,804,005.

The image storage devices 32 and 33 for temporarily storing the scanned images during off-line operation may be endless magnetic tapes and drives, where the optical image is stored as a magnetic recording of the image. This storage is performed in known fashion and with available hardware by employing a line or bank of photocells or solid state charge-coupled devices (not shown) to respond to the scanned optical image from the scan station and to generate electrical signals corresponding to the image for storage on the magnetic tape (not shown). During readout, such electrical signals are applied to a bank of LED's (light emitting diodes) to reconvert the electrical image back into optical form, for application to the common photoconductor 41. The storage and readout of a scanned optical image to and from a magnetic tape, or other storage mechanism, is well known in the art and "on the shelf" hardware is presently available for this purpose. Accordingly, further description and illustration of such known hardware is not believed to be necessary in this specification.

For controlling this machine to provide the off-line and on-line multiplexing as described, it is preferred to employ a microprocessor chip and related controls 40 since such chips and hardware are presently available in "on the shelf" form and are inexpensive; and have more than the needed memory and address capacity to provide the logical functions described for a multiplexed machine having four or more scan stations. Additionally, each of the components of the machine are preferably monitored for operability and the monitoring sensors are applied to the same microprocessor 40 to shut off the machine when the component or machine are not functioning in its preprogrammed manner.

Returning to FIG. 2, for a brief description of the functioning of the microprocessor 40 to provide the mode-of-operation described, each of the coin operated switches from the different stations 30 and 31 are connected over line 49 and 50, respectively to the microprocessor 40 to initiate the different logical modes of operation. Upon actuation of a first one of those switches, such as line 50, the processor 40 connects scan station 31 over 39 and line 36 directly to the common photoconductor 41 for on-line operation and automatically interconnects the other station 30 over 38 to storage unit 32 in readiness for off-line operation in the event that the other scan station 30 is actuated during the development cycling of the machine in response to station 31. The image from station 31 directly applied to photoconductor 41, is developed by toner 44 and transferred to a copy sheet dispensed by paper feed 42. This sheet also bears the developed identifying codes (of dots or bars) at its margin, as previously described, whereby the completed copy is then correctly diverted to output 46 associated with scan station 31.

In the event that the other scanner 30 is actuated during the above developing cycle, its image is temporarily stored by magnetic tape recorder 32, and following completion of the previous developing cycle, the microprocessor 40 initiates readout of the image from storage 32 over line 35 to the photoconductor 41 to commence the next development cycle. Since the common electrostatic development process occurs at much higher speed than the time that the user manually expends at the optical scan station in placing the master to be copied in place, and inserting the coin or operating an actuate button, the multiplexing machine appears to operate almost instantaneously in response to all users, even where the machine employs four or more scan stations combined with a common electrostatic developer mechanism.

Each of the component sections of the machine including the scan stations 30 and 31, the storage units 32, and 33, the photoconductor 41, the paper feed 42, the charger 43, the developer or toner 44, and the conveyors and outlets 45 and 46 are all monitored, and the outputs of monitoring sensors (not shown) are coupled to the microprocessor 40. In the event of a malfunction in any of the common components of the developing apparatus, the microprocessor 40 is preprogrammed to shut off the entire machine by disconnecting the power. In the event of malfunction of apparatus associated with only one of the scan stations or storage, the microprocessor 40 functions to contol the disconnect or disablement of only that portion. Each station may also be provided with a built in indicator panel providing a number of fixed messages, such as "This section out of order—use one of the others", or "Machine disabled due to malfunction" or other. The proper message from such indicator is also preferably energized by a control signal from the microprocessor 40 concurrently when the disconnect function is performed.

In the event that two or more of the scan stations are actuated simultaneously, rather than sequentially as described above, the microprocessor 40 may be preprogrammed to control the subsequent operation in either of two different modes-of-operation. For a "simultaneous" development mode, a plurality of scanned images can be simultaneously applied to different regions of a larger photoconductor drum or belt, as generally shown by scan stations 56 and 57 of FIG. 3, and the development of the plural images may be conducted during a single development cycle of the development apparatus. This mode is performed by the microprocessor 40 controlling each of the charger 43, toner 44, and paper feed 42, to operate twice, or more, during each cycle or rotation of the drum or belt, such that each latent image is properly charged and toned; and the toned or developed image is transferred to a separate copy sheet dispensed by the paper feeder. This simultaneously mode requires, of course, that each of these component parts be made in more complex and expensive form to provide the plural copy per cycle operation in response to simultaneous scan as well as the one copy per cycle normal mode-of-operation.

Alternatively, to simplify the machine and reduce its cost, the microprocessor 40 can be preprogrammed in response to simultaneous actuation of two or more scan station, to connect only one station for on-line operation and the others for off-line operation, in a predetermined or given order or arrangement. Thus, for example, if stations 30 and 31 are both actuated simultaneously, the micprocessor 40 may be programmed to first interconnect station 30 for on-line operation and station 31 for off-line operation. Similarly if other stations (not shown in FIG. 2) are simultaneously actuated, the microprocessor 40 controls their on-line and off-line operation in a given predetermined order. The programming versatility of available microprocessors chips permits considerable variety of different "logical" functions or selection to be preprogrammed into the chip that would easily include the above rather simplified modes as well as others.

Figure 3:
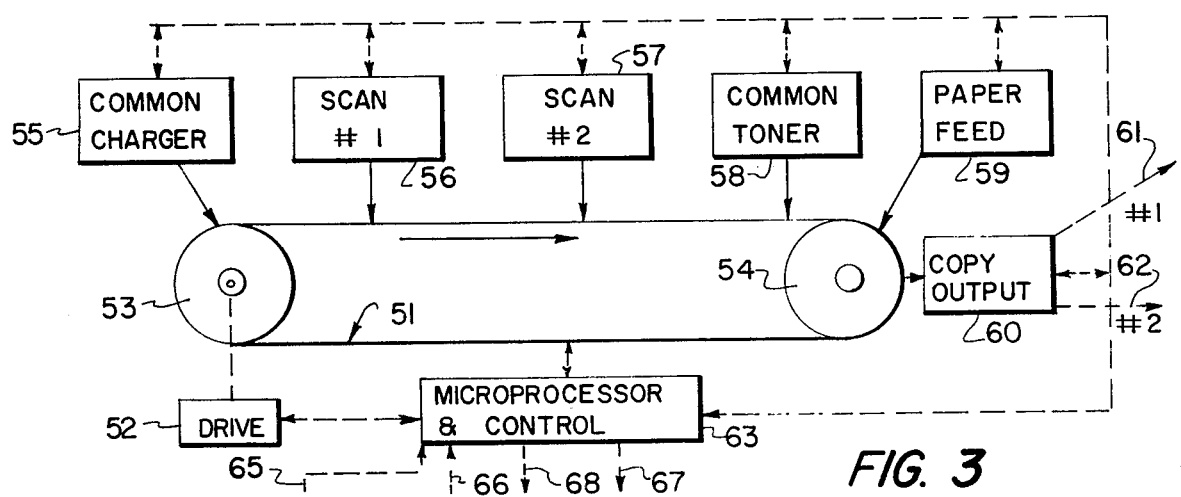
FIG. 3 is a schematic block diagram, similar to FIG. 2, but illustrating a simultaneous multiplexing system according to the invention.

In FIG. 3, there is shown another embodiment of the invention wherein the machine always provides "simultaneous" or on-line operation for all scan stations regardless of their order of actuation or relative time of actuation. In a preferred mode of operation, particularly adapted for use when a relatively large number of scan stations are multiplexed to a common electrostatic developer, the photoconductor drum or belt 51 is driven continuously by motor drive 52, 53, and its surface is electrically charged for each cycle of rotation by high voltage charger 55. Each of the scan stations 56, 57, and others, are provided with light piping (not shown) or like optical means, for applying the scanned image from that station to a different displaced position with respect to the moving photoconductor 51, as is shown. Since the drum or belt 51 is constantly moving from left to right, a simultaneous actuation of scan stations, such as 56 and 57, operates to apply images to the charged photoconductor belt 51 at displaced positions, and both images are toned or developed in succession as the belt passes the common toner station 58. Continued movement of the belt 51 brings the toned images in sequence to the transfer station where the images are transferred to copy sheets from paper feed station 58 and finally directed at output 60 to the correct one of delivery chutes 61 or 62, as previously described. Thus, in this simultaneous mode of operation, the simultaneously actuation of plural scan stations functions to apply each of the latent images to displaced positions on the rotating drum or belt photoconductor 51 resulting in the development of all images in sequence, and the delivery of the copies during a single rotative cycle of the photoconductor. As described above each scan station also applies its identifying code at the border of its image on the photoconductor 51 enabling each developed copy to be properly conveyed and diverted into its correct outlet chute 61, 62 associated with its scan station.

In the event that the scan stations 56, 57 are actuated in sequence, however, the operation differs since the machine is required to insure that the optical images are not applied to the same location on the moving belt or drum 51 or in overlapped or partially overlapped positions (e.g. double exposure). This could occur, for example, should an earlier scan station 56 be actuated first to apply an image and as the exposed portion of the belt 51 passes the region of a later scan station 57, the later scan station 57 is actuated. To prevent this from happening, the microprocessor 63 monitors each scan station and records or "stores" in its memory the time of actuation of that station in response to closure of its actuating switch or operation of its coin operated switch. The microprocessor 63 additionally controls and monitors the operation of the conventional scanning motors (not shown) of each scan station, and accordingly it may briefly delay the commencement of an optical scan at any particular scan station. Still further, the microprocessor 63 monitors and controls the speed of rotation of the photoconductor belt 51 or drum. Therefore, it may readily determine at the time of actuation of the start switch of any one of the scan stations whether or not the moving photoconductor belt 51 has an unexposed region available at that station to receive a latent image. In the event that a latent image or portion thereof is momentarily present on the moving belt 51 at the location of a particular scan station at its time of actuation, then the microprocessor 63 temporarily delays the commencement of optical scanning at that station until an unexposed region on the moving belt (or drum) is available to receive the scanned image. As previously mentioned, the preferred development mechanism employed is operated at high speed, and can accordingly produce copies at a rate much faster than the "manual" time required to feed master documents at any one of the stations. Accordingly the time delayed scanning as imposed by the microprocessor 63 at any one station to prevent overlapped images is so short in time as not to be noticeable by the user at that station. Thus, according to this mode-of-operation of FIG. 3, all of the different scan stations, such as 56 and 57, may be operated at random and independently of the others, and all apply their scanned optical images directly to a moving photoconductor 51 under the control of the microprocessor 63. The microprocessor 63, on the other hand, "remembers" the locations on the moving photoconductor 51 of each image as it is applied, so that it can determine by a simple logical operation whether a previous latent image exists on the photoconductor 51 at the location of a particular scan station at the time such scan station is actuated by a later user to commence scanning. In the event that such image or image portion does exist, the commencement of scanning at that station is momentarily delayed until an unexposed area of photoconductor becomes available whereupon the scan station is then enabled to commence its optical scan and apply the image to the moving photoconductor 51.

Since the microprocessor 63 is programmed to monitor and remember the location of each image applied to the traveling photoconductor 51 from each of the scan stations, the microprocessor 63 may also be employed to control the output and direct each of the completed copies to the correct one of outlets 61, 62 associated with the originating scan station. By employing the microprocessor 63 to provide this additional output copy diverting function, the necessity for applying an identifying code to each image, as discussed above, can be avoided, thereby simplifying the mechanism required at each scan station.

In a similar manner, the microprocessor 40 employed in the embodiment of FIG. 2 may be used to control the outlet feed of the completed copies thereby to convey the copy to the correct one of the outlet chutes 45 or 46 associated with the station where the original was scanned. In brief, this function is performed by the microprocessor 40 monitoring the actuation of each scan station that is operating "on-line" and concurrently connecting the outlet for the completed copy to chute 45 or 46 corresponding to the station that is then functioning in an on-line mode. Where a plurality of scan stations such as 30 and 31 are actuated simultaneously and the machine is preset for development of all images during one cycle of operation of the common photoconductor 41, the microprocessor 40 may be programmed to sequentially divert each of the copies after its image is fused to a different one of the outlet chutes 45 or 46 in the same order as the original application of the latent images to the photoconductor 41. For example, for simultaneous operation of scan stations 30 and 31, the machine is arranged to apply the scanned optical image from station 30 to the photoconductor 41 at a location ahead of or in advance of the location where the image from station 31 is applied. In the normal cycling of the development operation (e.g. rotation of photoconductor 41), the image from station 30 is therefore developed first and followed by the development of the image from station 31. The microprocessor 40 monitors the completion of the first produced copy and diverts this copy to outlet 45 corresponding to scan station 30. It thereafter monitors and diverts the next copy produced to outlet 46 associated with scan station 31.

As is now apparent to those skilled in the art many changes may be made in the described embodiments without departing from the scope of the inventin. For example, although the use of microprocessors is preferred for monitoring and controlling the operations of the sequential system of FIG. 2 and the simultaneously system of FIG. 3, such preference is based upon the present availability and inexpensiveness of such integrated devices and the fact that presently available microprocessors incorporate more than sufficient memory capacity, addressability, and programmability to perform the comparatively simple logical functions as described. However, discrete electronic circuitry and controls may be readily substituted for microprocessors to perform the same monitoring and multiplexing functions. Additionally, each station may be provided with additional controls, such as for selecting multiple copies, changes in size, and other features that are presently available in single input station electrostatic photocopiers. Due to the availability of individually programmable data processors and microprocessors, the multiplexing machines may also be provided in modular form, using a single central development apparatus and a variable number of separate input-output modules that are individually connectable to the central apparatus to expand or diminish the capacity of the installation for different users, such as libraries. Therefore machines having either two, three, four, or more scan stations may be provided by employing a common development module, a desired number of like connectable scan station modules, and a programmable processor and interfaces for multiplexing the modules to the common developer. Since these and other changes can be made without departing from the invention, this inventin should be considered as being limited only by the following claims:

What is claimed is:

1. A randomly operable multiplexing electrostatic photocopier comprising:
   a plurality of independently operable optical scanning stations, each adapted to randomly receive optically reproduceable images to be copied,
   an image storage means selectively connectable to one of said stations for receiving and temporarily storing an image scanned by one of said stations and having means for reproducing said image at a later time,
   a common electrostatic copying mechanism being selectively connectable for on-line operation to said scanning stations and off-line to said storage means,
   and logically operated control means for selectively interconnecting any of said plurality of scanning stations and said storage means to said common electrostatic copying mechanism whereby images to be copied may be selectively applied on-line to said common electrostatic copy mechanism for reproduction from any of said scanning stations and off-line to said common electrostatic mechanism for reproduction from said storage means after a delayed time.

2. In the multiplexing electrostatic photocopier of claim 1, a plurality of image storage means, with one for each scanning station, and said logically operated control means responsive to the actuation of an image scanning station, to determine, the then current operating condition of said logically operated control means, to selectively interconnect said station or storage means to said copy mechanism for one of on-line and off-line operation depending upon said current operating condition of the control means.

3. In the multiplexing electrostatic photocopier of claim 1, said common copying mechanism having an outlet for delivering a document having the copied image, and automatically operated means for further delivering said document to that one of the scanning stations that produced the image.

4. In the multiplexed photocopier of claim 3, said scanning stations and copying mechanism providing an identification of that one of the scanning stations scanning said image, and said automatically operating means responsive to said identification for further delivering the copy document to that scanning station that provided the image to be copied.

5. In the multiplexing photocopier of claim 1, said logically operated control means responsive to simultaneous actuation of plural scanning stations to control the common copier for reproducing the plural images in programmed timed sequence.

6. In the multiplexing photocopier of claim 1, said logically operated control means responsive to simultaneous actuation of plural scanning stations for automatically interconnecting one of said scanning stations for on-line operation to the common copying mechanism and another scanning station for off-line operation to said image storage means.

7. In the multiplexing photocopier of claim 1, said logically operated control means responsive to simultaneous actuation of plural scanning stations for automatically interconnecting said plural stations for simultaneous on-line operation to the common copier mechanism and responsive to non-simultaneous but overlapping actuation of plural scanning stations for interconnecting a first actuated station for on-line operation to the common copying mechanism and a second actuated station to said image storage means for off-line operation to be completed following the copying of the image scanned at said first station.

8. A multiplexing electrostatic photocopier comprising:
   a plurality of independently operable scanning stations, each adapted to randomly receive optically reproduceable images to be copied,
   a common high speed electrostatic developing mechanism responsive to said plurality of scanning stations for producing copies of said images,
   and a data processor and control means for multiplexing said common electrostatic developing mechanism with said plurality of stations to selectively respond to actuation of different ones of said stations in time sequence and simultaneously to control the development of the scanned images by said electrostatic developing mechanism.

9. In the photocopier of claim 8, a plurality of copy directing outlets with one for each of said scanning stations and each said outlet disposed near its associated scan station, and means included in said common electrostatic developing mechanism controlled by said data processor for directing the developed copies of said images to the proper copy receiving output corresponding to the scan station originating that image.

10. In the photocopier of claim 8, said common high speed electrostatic developing mechanism having a common moving photoconductor to receive plural latent images from said plurality of scan stations, said data processor having means for monitoring the actuation of each scan station and the positioning of said moving photoconductor, thereby to continuously determine the position of each previously applied latent image on the moving photoconductor, said scan stations having means for controlling the scanning of optically reproduceable images applied to said stations in response to both actuation by users and said data processor, whereby said data processor enables the common development apparatus to respond to all of said plural stations regardless of the random time of operation of said stations and the simultaneous time of actuation of said stations.

11. In the photocopier apparatus of claim 10, each of said plurality of scan stations applying its optical image to said moving photoconductor at a different displaced location from the others, and said data processor determining when a previously applied latent image on the photoconductor is located at the position of a subsequent scan station to momentarily delay any scanning actuation of said subsequent station until a portion of the moving photoconductor reaches that station that is free of any previously applied latent image.

12. In the photocopier of claim 8, said data processor having means for monitoring said development apparatus and said scan stations, and selectively disabling said entire machine for a common malfunction affecting all stations, and selectively disabling only a particular scan station for malfunctions affecting only said particular station.

13. In the photocopier of claim 8, said data processor having means for monitoring said development apparatus and said plural scan stations, and automatically disabling any particular scan station in the event of a malfunction and the entire machine in response to a common malfunction, and each scan station having an indicator controlled by said data processor for indicating malfunctioning to persons seeking to use said stations.

14. In a multiple user photocopy machine including:
a plurality of independently usable optical reader stations, each for receiving and producing an optical image to be reproduced independantly of the other optical reader stations,
and a common electrostatic developing mechanism associated with said readers in said machine, said mechanism including at least one photoconductor, charger, toner, and copy sheet feed and delivery mechanism,
said electrostatic developing mechanism being automatically functionally connectable to each of said readers to develop said images and provide hardcopy reproductions of said images.

15. In the machine of claim 14, said readers being selectively cyclicable in both a simultaneous and sequential mode-of-operation.

16. In a photocopier machine having plural optical reader stations for independantly receiving and imaging different objects to be copied, a plurality of copy outlets, each different outlet associated with a different reader station and control means responsive to the operation of any one of the reader stations for directing the copy produced from that station to the outlet associated with said station.

17. In the machine of claim 16, said means including a microprocessor.

* * * * *